United States Patent [19]

Kim

[11] Patent Number: 6,104,435
[45] Date of Patent: Aug. 15, 2000

[54] APPARATUS AND METHOD FOR GENERATING DATA SEGMENT SYNC SIGNAL FOR HDTV

[75] Inventor: Ki-Bum Kim, Seoul, Rep. of Korea

[73] Assignee: Samsung Electronics Co., Ltd., Kyungki-do, Rep. of Korea

[21] Appl. No.: 08/737,796

[22] PCT Filed: Jun. 5, 1996

[86] PCT No.: PCT/KR96/00086

§ 371 Date: May 7, 1997

§ 102(e) Date: May 7, 1997

[87] PCT Pub. No.: WO96/42171

PCT Pub. Date: Dec. 27, 1996

[30] Foreign Application Priority Data

Jun. 9, 1995 [KR] Rep. of Korea ...................... 95/15218

[51] Int. Cl.[7] .................................................. H04N 5/10
[52] U.S. Cl. ............................ 348/531; 348/525; 375/365
[58] Field of Search ..................................... 348/471, 472, 348/495, 525, 526, 527, 528, 529, 530, 531, 532, 533, 534, 535; 375/343, 354, 362, 365, 368; H04N 5/10

[56] References Cited

U.S. PATENT DOCUMENTS

| | | | |
|---|---|---|---|
| 5,414,699 | 5/1995 | Lee | 370/18 |
| 5,416,524 | 5/1995 | Citta et al. | 348/471 |
| 5,594,506 | 1/1997 | Yang | 348/531 |
| 5,648,987 | 7/1997 | Yang et al. | 348/607 |

*Primary Examiner*—Michael H. Lee
*Attorney, Agent, or Firm*—Sughrue, Mion, Zinn, Macpeak & Seas, PLLC

[57] ABSTRACT

An apparatus for generating a sync signal of a data segment in a high definition television is disclosed including: a circuit (41) for delaying and integrating received data segment signals in the period of the segment; a delay circuit (42) for delaying the output of the circuit in the period of sync signals, multiplying the delayed sync signals by a correlation value of a corresponding sync signal, and summing the multiplied sync signals, to thereby detect a sync signal having its peak for the period of the sync signal; and a circuit (43) having a predetermined reference value and for comparing the output of the sync detecting circuit with the reference value, to thereby generate the sync signal of data segment. This apparatus is capable of accurately generating segment sync signals in any environment of transmission channel in an HDTV.

14 Claims, 4 Drawing Sheets

APPARATUS AND METHOD FOR GENERATING DATA SEGMENT SYNC SIGNAL FOR HDTV

TECHNICAL FIELD

The present invention relates to a high definition television (HDTV) receiver and its data receiving method, and more particularly, to an apparatus and method for generating a segment sync signal from data received.

BACKGROUND ART

Generally, for an HDTV, a television broadcasting station inserts a sync signal in front of signals transmitted in units of horizontal lines, and a receiver detects the sync signal from the transmitted signals, synchronizes the horizontal line signals, and processes the received signal. According to their types, HDTVs have different formats of transmission data of horizontal lines. FIG. 1 shows the format of data segment of US Grand Alliance (GA) HDTV, in which one data segment is made up with 832 symbols, 828 symbols for data and four symbols for a data segment sync signal. One data segment corresponds to one horizontal line of NTSC mode. The sync signal of the data segment is formed with four symbols indicative of the starting of the respective data segments, as shown in FIG. 1. Here, the data segment sync signal is made in such a certain pattern that four symbols have the signal levels of +5, −5, −5, +5, respectively. The data segment signals have random levels of signal.

For this reason, in an apparatus for receiving a transmission signal of GA mode, it must be processed after the sync signal of data segment must be detected for the first cycle of four symbols of the respective data segments for the synchronization of data segment signals received thereafter.

DISCLOSURE OF INVENTION

Therefore, it is an object of the present invention to provide an apparatus and method for generating a sync signal indicative of the starting of a data segment received in an HDTV.

It is another object of the present invention to provide an apparatus and method for generating a sync signal indicative of the starting of a data segment in an HDTV, using its signal level characteristic.

To accomplish the object of the present invention, there is provided an apparatus for generating a sync signal of a data segment in a high definition television, comprising: means for delaying and integrating received data segment signals in the period of the segment; means for delaying the output of the integration means in the period of sync signals, multiplying the delayed sync signals by a correlation value of a corresponding sync signal, and summing the multiplied sync signals, to thereby detect a sync signal having its peak for the period of the sync signal; and means having a predetermined reference value and for comparing the output of the sync detecting means with the reference value, to thereby generate the sync signal of data segment.

BEST MODE FOR CARRYING OUT THE INVENTION

Figure 1:
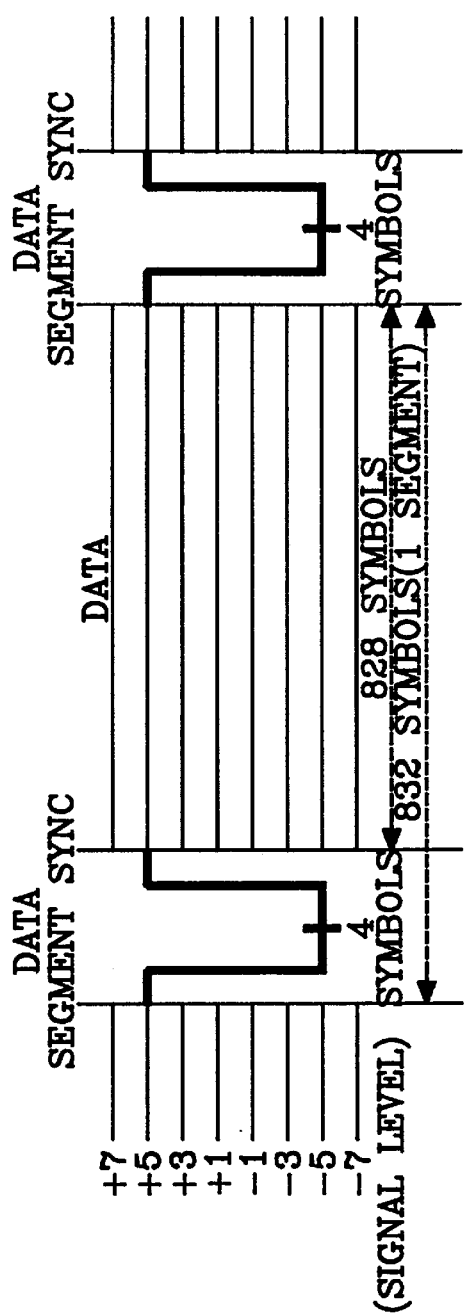
FIG. 1 shows a format of data segment in an HDTV.

Hereinafter, preferred embodiments of the present invention will be described in detail with reference to the attached drawings. It should be noted that like components are designated like reference numerals throughout the specification as many as possible.

In the preferred embodiment, the term "HDTV" means a HDTV of GA mode. The term "data segment signal" means a signal of 832 symbols in which 828 symbols are for data and four symbols are for sync signals, a shown in FIG. 1. The term "sync signal" means a symbol of four bits which indicates the starting of the data segment signal. The first and fourth sync symbols have a first signal level, whereas the second and third sync symbols have a second signal level. Here, the first signal level is positive, the second signal level being negative.

Figure 2:
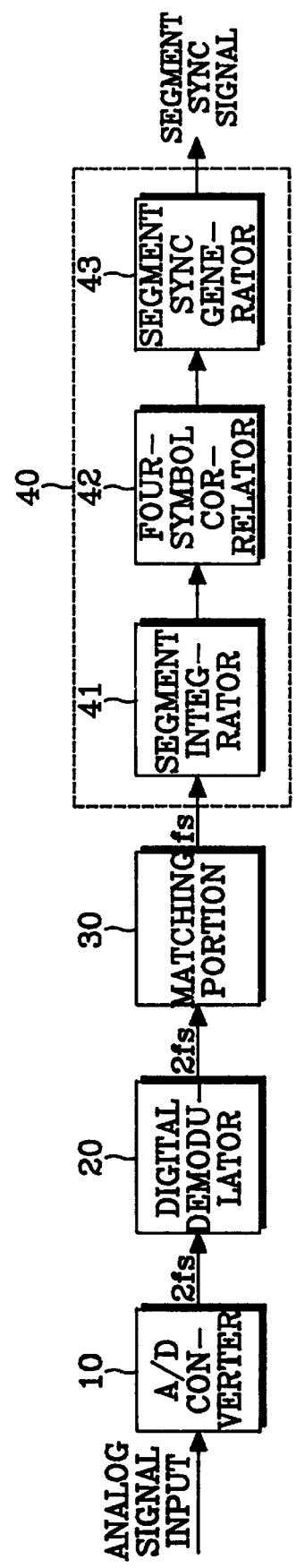
FIG. 2 is a block diagram of a data segment sync signal generator in accordance with the present invention.

Referring to FIG. 2, an analog-to-digital (A/D) converter 10 converts an analog signal of a selected channel and output from a tuner into digital data. A digital demodulator 20 restores the data output from A/D converter 10 to transmission data. Digital demodulator 20 may use a digital frequency & phase lock loop. A matching portion 30 is a matched filter to control a symbol rate to be matched with a segment sync signal generator. In other words, the symbol rate output from digital demodulator 20 is 2 fs which is changed into fs in matching portion 30.

The circuit for generating the segment sync signal roughly consists of a segment integrator 41, four-symbol correlator 42, and segment sync generator 43. Segment integrator 41 delays and integrates received data segment signals in the period of segment. Four-symbol correlator 42 delays the output of segment integrator 41 in the period of the sync signal, multiplies the delayed sync signals with the correlation value of corresponding sync signals, sums the multiplied sync signals, and thereby detects a sync signal having its peak in the period of sync signal. Segment sync generator 43 has a predetermined reference value, and compares it with the output of four-symbol correlator 42 to thereby generate the sync signal of the data segment.

Figure 3:
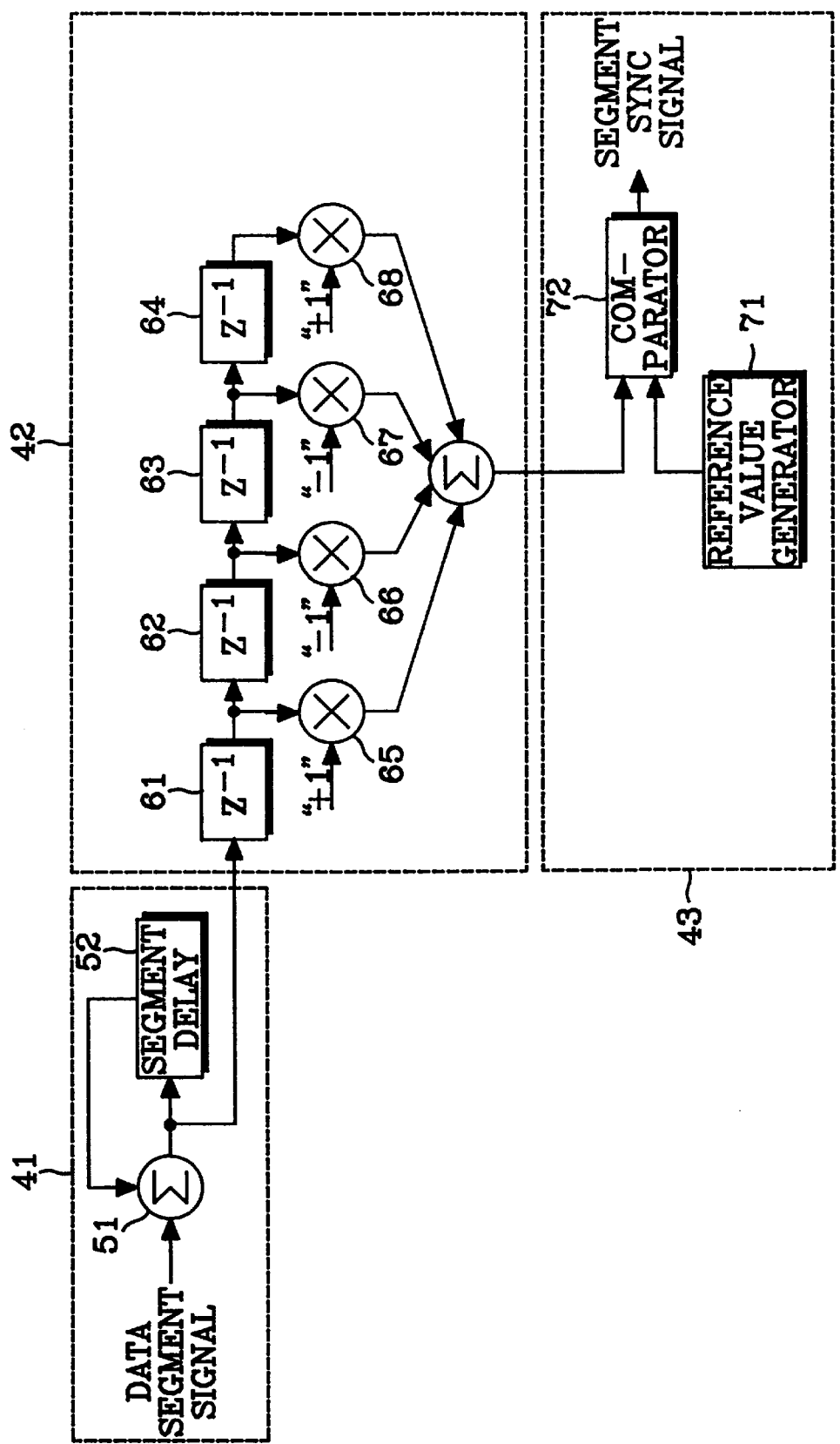
FIG. 3 is a circuit diagram of one embodiment of the data segment sync signal generating portion of FIG. 2.

FIG. 3 shows one embodiment of the present invention in which segment integrator 41, four-symbol correlator 42 and segment sync generator 43 of FIG. 2 are depicted in detail.

In the configuration of segment integrator 41, a summer 51 sequentially sums and integrates currently input data segment signals and previous one-segment-delayed data segment signals. A segment delay 52 stores integrated data segment signals sequentially output from summer 51, delays them by one cycle of segment, and negatively feeds them back to summer 51. Segment integrator 41 sequentially sums previously integrated data segment signals and currently input segment signals. Here, it is noted that the summed signals are made so that the symbols at the same positions are summed and integrated in the period of one segment.

In the configuration of four-symbol correlator 42, first-fourth delays 61–64 are provided for the delay means in order to sequentially delay the integrated values of the respective symbols sequentially output from summer 51 and thereby generate first-fourth delay symbol signals. First-fourth multipliers 65–68 are given for the multiplication means in order to multiply the first-fourth delay symbol signals by corresponding correlation values of the sync signals, respectively. Here, a positive value +1 is input to first and fourth multipliers 65 and 68 so that the first and fourth sync symbol signals of a positive correlation are multiplied. A negative value is input to second and third multipliers 66 and 67 so that the second and third sync symbol signals of a negative correlation are multiplied to have a positive value. First-fourth multipliers 65–68 all output positive signals for the period of sync signal. Summer 69 sums the outputs of first-fourth multipliers 65–68, and generates a sync detection signal having its peak for the period of sync signal.

In segment sync generator 43, a reference value generator 71 generates a reference value which is smaller than the integrated value of sync signal output from summer 69 but greater than the integrated value of other random data. Comparator 72 compares the reference value with the sync detection signal output from summer 69, and generates a sync signal when the sync detection signal is greater than the reference value.

Figure 4A:
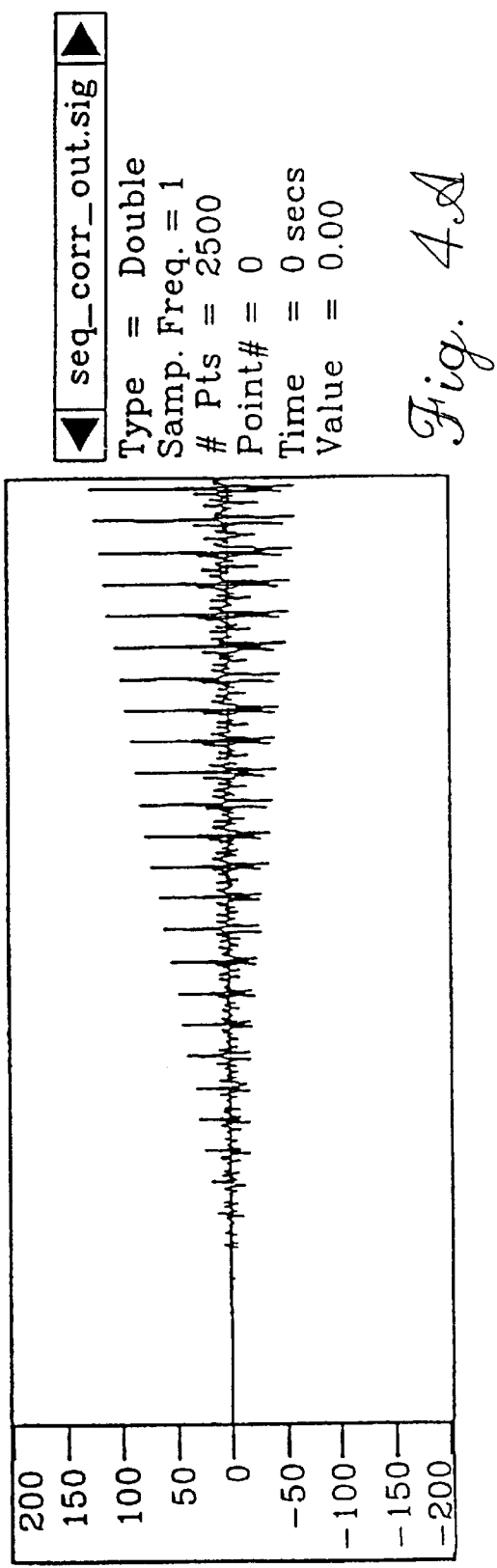
FIG. 4A is a diagram of waveform showing the output characteristic of the segment sync detector of FIG. 3.
Figure 4B:
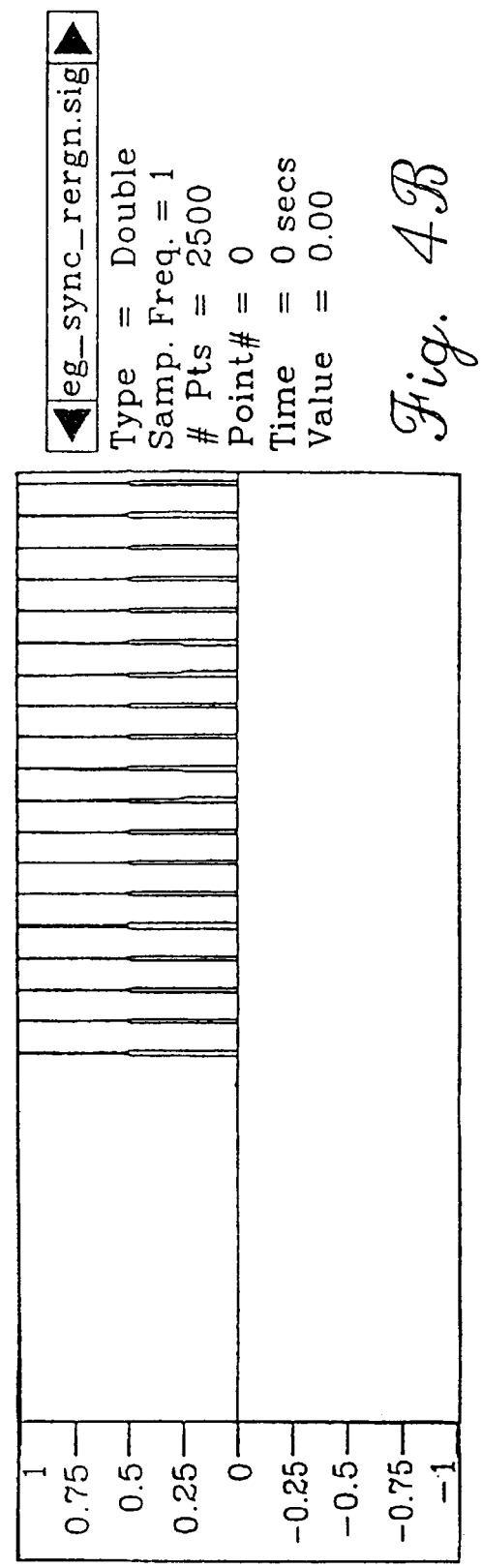
FIG. 4B is a diagram of waveform showing the output characteristic of the segment sync generator of FIG. 3.

FIG. 4A is a waveform diagram of showing the output characteristic of the integrated symbol data output from summer 69. FIG. 4B is a waveform diagram of the sync signal output from comparator 72.

For the description of the sync signal generator constructed as in FIG. 3 with reference to FIGS. 4A and 4B, double-input summer 51, through one input of which the segment signal output from matching portion 30 is input, sums the output of segment delay 52 input through the other input and a currently input segment signal. Here, segment delay 52 outputs one-segment-delayed data so that the two segment signals input to summer 51 become symbol data of the same position in the period of one segment. The summed data output from summer 51 is input to segment delay 52 and at the same time to first delay 61. Segment delay 52 delays data in the period of one segment, and stores the integrated value of corresponding symbol data summed in the period of segment. Segment integrator 41 continuously integrates corresponding symbol data in the respective data segment signals. Here, the integrated values of sync symbol repeatedly input for every segment gradually become greater than those of random data symbols.

The integrated values of symbol varying as above are sequentially delayed by first-fourth delays 61–64 to become first-fourth delay symbols. These first-fourth delay symbols are input to one port of first-fourth multipliers 65–68. The correlation values of the first-fourth sync symbols are input to the other port of first-fourth multipliers 65–68. In other words, the first and fourth sync symbols integrated and output from summer 51 become positive, whereas the second and third sync symbols become negative. If values +1, −1, −1, +1 are respectively input to the other ports of first-fourth multipliers 65–68, and the integrated value of the first-fourth sync symbols is input, the two signals are multiplied so that the sync symbols all are output as positive. For multiplication, in the sync signal of four symbols, the symbols become +5*+1, −5*−5, −5*−1, +5*+1 so that a predetermined value is generated for every segment period. In the random data portion, a random value is provided for every segment. First-fourth multiplication signals output from first-fourth multipliers 65–68 are summed and output from summer 69. Here, as shown in FIG. 4A, if summer 69 sums all the outputs of multipliers 65–68, the result has a very large correlation value in the sync signal portion, but is offset in the random data portion to be generated as a signal having a value much smaller than that of the sync portion.

For the output characteristic of the integrated correlation value output from summer 69, there is output a signal where the integrated correlation value output from the sync signal portion is significantly greater than that of the random data portion. The output signal becomes a sync detection signal.

The output of summer 69 is input to one port of comparator 72, and the reference value output from reference value generator 71 is input to the other port. Here, the reference value is set to be smaller than the integrated value of four symbols detected from the sync portion but greater than that detected from the random data portion. When reference value generator 71 produces the reference value in the above manner, and in case comparator 72 compares the reference value with the output of summer 69, a HIGH pulse signal is generated from the sync signal portion, and a LOW signal from the random data portion, as shown in FIG. 4B. Here, if the HIGH pulse output from comparator 72 as in FIG. 4B is used for the sync signal, the synchronization of a data segment signal received can be performed accurately. Therefore, the signal output from comparator 72 is generated as the sync signal of data segment.

The pulse is generated with the lapse of a predetermined time as shown in FIG. 4B because the reference value of comparator 72 is set to be smaller than the seventh correlation value but greater than the eighth correlation value in FIG. 4A. The reference value may be set as an optimal value, depending upon noise or the environment of transmission channel.

Figure 5:
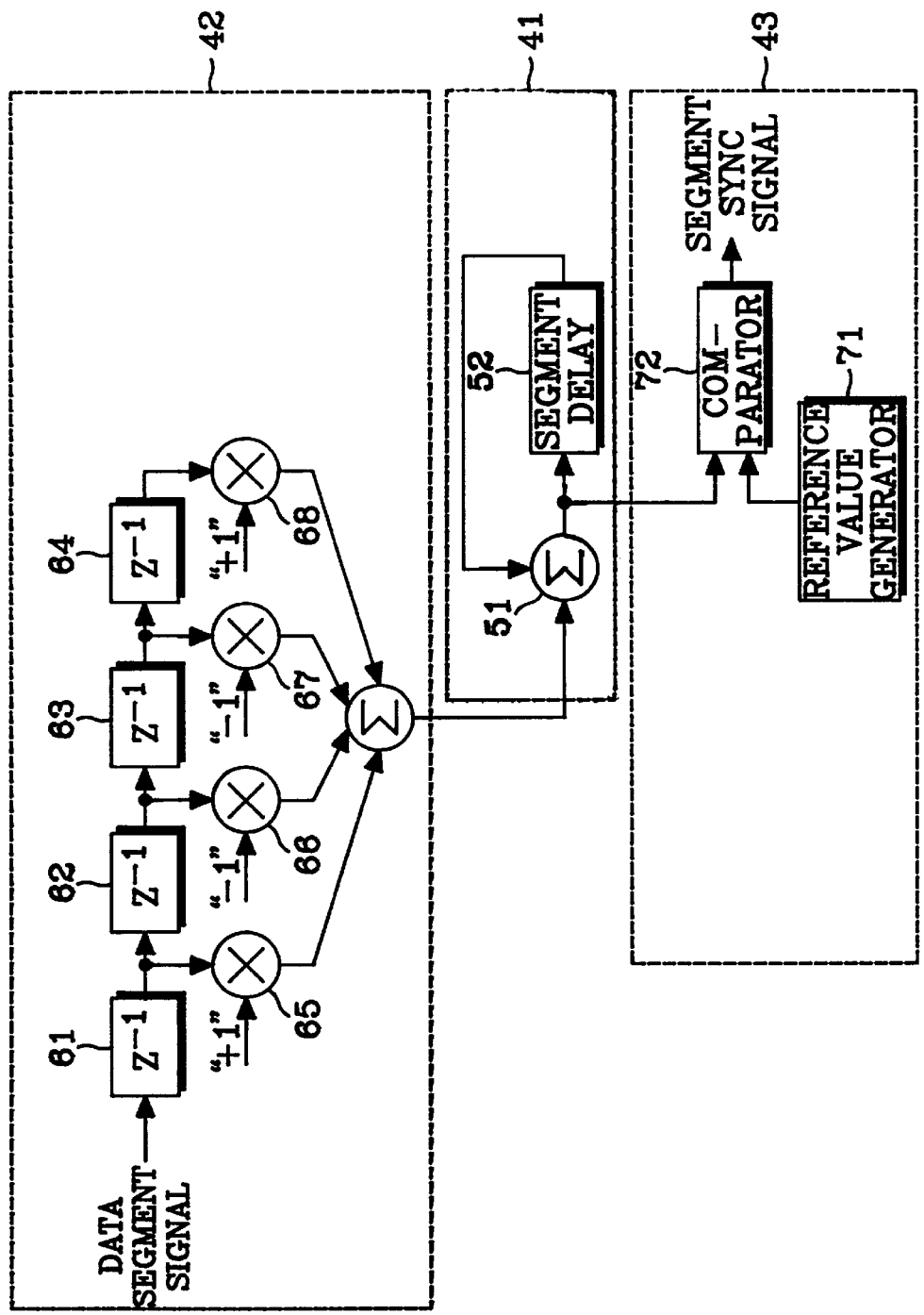
FIG. 5 is a circuit diagram of another embodiment of the data segment sync signal generating portion of FIG. 2.

Referring to FIG. 5, the same numerals are used as in the first embodiment of FIG. 3. In FIG. 3, there is presented a case in which sync detection is performed to detect the integrated value of four symbols in the sync portion after segment integration. However, the same effect as the first embodiment can be obtained even when input symbols delayed in units of segment are integrated after sync detection in accordance with the correlation value of four symbols. In the second embodiment shown in FIG. 5, the detection of sync portion of the segment signal is performed in four-symbol correlator 42, and then the symbols input from segment integrator 41 are delayed by one period of segment and summed with the integrated symbols.

As described above, in an HDTV, the present invention is able to accurately generate segment sync signals in any environment of transmission channel, using the integrated correlation value of data segment, and thereby precisely perform the reproduction of data transmitted.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An apparatus for generating a sync signal of the data segment in a high definition television, comprising:

first means for delaying, by a period of a segment, and integrating received data segment signals;

second means for delaying output signals of said first means by a period of sync signals, multiplying delayed output signals by respective correlation values of a corresponding sync signal to produce multiplication signals, and summing said multiplication signals to detect a sync signal; and third means for comparing an output of said second means with a reference value to generate said sync signal of said data segment.

2. A circuit for generating a data segment sync signal in a high definition television in which one data segment includes a sync signal and data, said circuit comprising:

first means for summing and integrating input data segment signals and delayed segment signals;

second means for delaying an output of said first means to generate delay symbol signals;

third means for multiplying said delay symbol signals by respective correlation values respectively corresponding to said sync signals;

fourth means for summing outputs of said third means to generate a peak for the period of said sync signals; and fifth means for comparing an output of said fourth means with a reference value to generate said sync signal of said data segment.

3. A method of generating a data segment sync signal in a high definition television in which one data segment includes a sync signal and data, said method comprising:

sequentially adding and integrating input data segment signals and previous one-segment-delayed segment signals;

delaying a segment signal generated in said step (a) to generate delay symbol signals;

multiplying said delay symbol signals by respective correlation values respectively corresponding to sync signals, to generate multiplication signals;

summing said multiplication signals to generate a peak for the period of said sync signal; and comparing a result of said summing with a predetermined reference value to generate said sync signal of said data segment.

4. A circuit for generating a data segment sync signal in a high definition television in which one data segment includes a sync signal and data, said circuit comprising:

first means for delaying input data segment signals to generate delay symbol signals;

second means for multiplying said delay symbol signals by respective correlation values;

third means for summing outputs from said second means, to generate a peak;

fourth means for summing and integrating an output of said third means and delayed segment signals to generate integration values of respective sync symbols and data symbols; and fifth means for comparing an output of said fourth means with a reference value to generate said sync signal of said data segment.

5. A method of generating a data segment sync signal in a high definition television in which one data segment includes a sync signal and data, said method comprising:

(a) delaying an input data segment signal to generate delay symbols;

(b) multiplying said delay symbols by respective correlation values to generate multiplication signals;

(c) summing multiplication signals to generate a peak for the period of said sync signal;

(d) sequentially adding and integrating summed signals of said multiplication signals and one-segment-delayed segment signals to generate a signal; and (e) comparing said signal with a predetermined reference value to generate said sync signal of said data segment.

6. An apparatus for generating a sync signal of the data segment in a high definition television, comprising:

a first delay for delaying data segment signals by a period of a segment;

an integrator for integrating received data segment signals based upon a delayed segment signal;

a second delay for delaying an output of said integrator for a sync signal period;

a multiplier for multiplying delayed sync signals output by said second delay by a correlation value of a corresponding sync signal;

an adder for summing multiplied sync signals output by said multiplier; and a comparator for comparing an output of said adder with a reference value to generate said sync signal of said data segment.

7. A circuit for generating a data segment sync signal in a high definition television in which one data segment includes a sync signal, said circuit comprising:

an integrator for summing and integrating input data segment signals and delayed segment signals;

a delay circuit for delaying an output of said integrator to generate delay symbol signals;

a multiplier for multiplying said delay symbol signals by correlation values;

an adder for summing outputs of said multiplier to generate a peak for the period of said sync signals; and a comparator for comparing an output of said adder with a reference value to generate said sync signal of said data segment.

8. A circuit for generating a data segment sync signal in a high definition television in which one data segment includes a sync signal and data, said circuit comprising:

a delay circuit for delaying input data segment signals to generate delay symbol signals;

a multiplier for multiplying said delay symbol signals by correlation values;

an adder for summing outputs from said multiplier to generate a peak for the period of said sync signal;

an integrator for summing and integrating an output of said adder and delayed segment signals to generate integration values of respective sync symbols and data symbols; and a comparator for comparing an output of said integrator with a reference value to generate said sync signal of said data segment.

9. A circuit for generating a data segment sync signal in a high definition television in which one data segment includes a sync signal of four symbols and data, said circuit comprising:

an integrator for summing and integrating input data segment signals and delayed segment signals;

first-fourth delay circuits for respectively delaying an output of said integrator to generate first-fourth delay symbol signals;

first-fourth multipliers for multiplying said first-fourth delay symbol signals by respective correlation values;

an adder for summing outputs of said first-fourth multipliers to generate a peak for the period of said sync signals; and a comparator for comparing an output of said adder with a reference value to generate said sync signal of said data segment.

10. A circuit for generating a data segment sync signal in a high definition television in which one data segment includes a sync signal of four symbols and data, said circuit comprising:

first-fourth delay circuits for respectively delaying input data segment signals to generate first-fourth delay symbol signals;

first-fourth multipliers for multiplying said first-fourth delay symbol signals by respective correlation values;

an adder for summing outputs from said first-fourth multipliers to generate a peak for the period of said sync signal;

an integrator for summing and integrating an output of said adder and delayed segment signals to generate integration values of respective sync symbols and data symbols; and a comparator for comparing an output of said integrator with a reference value to generate said sync signal of said data segment.

11. A method of generating a data segment sync signal in a high definition television in which one data segment includes a sync signal of four symbols and data, said method comprising:

(a) sequentially adding and integrating input data segment signals and previous one-segment-delayed segment signals;

(b) delaying a segment signal generated in said step (a) to generate first-fourth delay symbol signals;

(c) multiplying said first-fourth delay symbols signals by correlation values respectively corresponding to sync signals to generate first-fourth multiplication signals;

(d) summing said first-fourth multiplication signals to generate a peak for the period of said sync signal; and (e) comparing a result of said summing with a predetermined reference value to generate said sync signal of said data segment.

12. A method of generating a data segment sync signal in a high definition television in which one data segment includes a sync signal and data, said method comprising:

(a) delaying an input data segment signal to generate first-fourth delay symbols;

(b) multiplying said first-fourth delay symbols by respective correlation values to generate first-fourth multiplication signals;

(c) summing said first-fourth multiplication signals to thereby generate a peak for the period of said sync signal;

(d) sequentially adding and integrating summed signals of said multiplication signals and one-segment-delayed segment signals to generate a signal; and (e) comparing said signal with a predetermined reference value to generate said sync signal of said data segment.

13. The circuit for generating a data segment sync signal according to claim 1 wherein a data segment includes a predetermined number of bits, and the first means delays an output by a time period corresponding to a length of the data segment, such that each bit position in the data segment is integrated with a bit in a corresponding bit position of a delayed data segment.

14. The circuit for generating a data segment sync signal according to claim 7, wherein a data segment includes a predetermined number of bits, and the integrator integrates each bit of the data segment at a predetermined position with a corresponding bit at the predetermined position in the delayed data segment.

* * * * *